(12) United States Patent
Varrin et al.

(10) Patent No.: US 9,323,759 B1
(45) Date of Patent: Apr. 26, 2016

(54) MULTIPROCESS DIVIDED FILE SYSTEM BACKUP

(71) Applicant: EMC Corporation, Hopkinton, MA (US)

(72) Inventors: Daniel Varrin, Oakville (CA); Scott Quesnelle, Burlington (CA)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 13/631,701

(22) Filed: Sep. 28, 2012

(51) Int. Cl.
*G06F 7/00* (2006.01)
*G06F 17/30* (2006.01)

(52) U.S. Cl.
CPC ................................. *G06F 17/30073* (2013.01)

(58) Field of Classification Search
CPC .................................................. G06F 17/30073
USPC ........................................................... 707/652
See application file for complete search history.

(56) References Cited

U.S. PATENT DOCUMENTS

| 6,847,984 B1 * | 1/2005 | Midgley et al. | |
| 7,574,461 B1 * | 8/2009 | Armorer et al. | |
| 2005/0278493 A1 * | 12/2005 | Lin et al. | 711/162 |
| 2010/0262585 A1 * | 10/2010 | Rosikiewicz et al. | 707/679 |

* cited by examiner

*Primary Examiner* — Ajith Jacob
(74) *Attorney, Agent, or Firm* — Van Pelt, Yi & James LLP

(57) ABSTRACT

A method of backing up data is disclosed. Information is collected from a file system corresponding to an initial backup set, wherein the initial backup set comprises a set of data configured to be backed up, and wherein the collected information comprises information regarding how the initial backup set is organized within the file system. Two or more subdivided backup sets are determined based at least in part on the collected information. The two or more subdivided backup sets are backed up.

33 Claims, 7 Drawing Sheets

MULTIPROCESS DIVIDED FILE SYSTEM BACKUP

BACKGROUND OF THE INVENTION

The contents and data of computer systems or information systems can be lost after a data loss event. Therefore, backup is important for ensuring recovery of the data of the computer systems or information systems in the case of corruption, data loss, or disaster. Recently, enterprises and organizations are experiencing a massive growth in data use. The rapid growth is fueled by the increasing volume and detail of information captured by the enterprises, and by the rise of usage of multimedia, social media, the Internet, and the like. As a result, the time required to backup the data of computer systems or information systems is increasing at a rapid pace as well.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of backing up data is disclosed. Information is collected from a file system corresponding to an initial backup set, wherein the initial backup set comprises a set of data configured to be backed up, and wherein the collected information comprises information regarding how the initial backup set is organized within the file system. Two or more subdivided backup sets are determined based at least in part on the collected information. The two or more subdivided backup sets are backed up.

Figure 1:
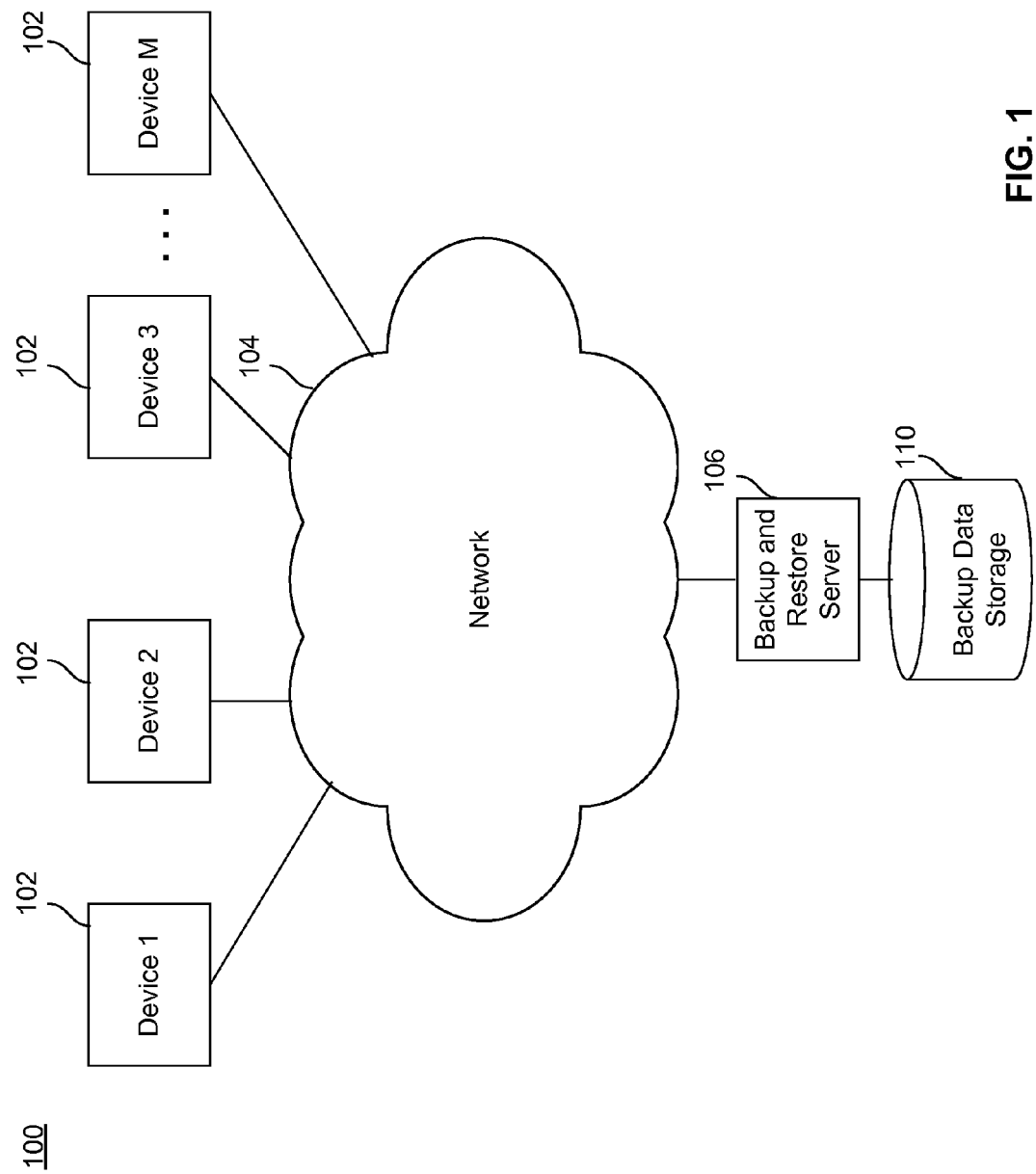
FIG. 1 is a block diagram in which a plurality of devices can be backed up by an embodiment of a backup and restore system.

FIG. 1 is a block diagram in which a plurality of devices can be backed up by an embodiment of a backup and restore system. As shown in FIG. 1, a device 102 (e.g., device 1) is connected to other devices, servers, or other elements via a network 104. Network 104 may include a dedicated communication link, one or more networks, a local area network, a wide area network, a storage area network, the Internet, a wired network, a wireless network, and the like. Devices 102 may include desktop computers, laptop computers, workstations, mainframe computers, or any other devices that include storage media for storing data, including hard disk drives, floppy disks, optical discs, flash memory, and the like. File systems may be used on devices 102 to organize data in an efficient manner and to maintain the physical locations of the computer files that are stored on the devices.

The contents and data stored in devices 102 can be lost after a data loss event. For example, the contents and data of the devices 102 may be accidently deleted by end-users, intentionally corrupted by malicious efforts of outsiders, or destroyed by a disaster, such as a fire or earthquake. Therefore, the contents and data of the devices 102 should be backed up periodically, such that they may be restored after a data loss event.

As shown in FIG. 1, a backup and restore server 106 is connected to devices 102 via network 104. A system administrator or a user may configure backup and restore server 106 to periodically backup the contents and data of a particular device 102 into a backup data storage 110. Backup data storage 110 may include hard disks, solid state storages, virtual tape libraries (VTL), magnetic tapes, and the like. In some embodiments, during a backup, an entire file system mounted on a device 102 is backed up by a single process running as a client on the device 102. For example, the process may read all the directories and files on the file system, process the data contained in the directories and files, and then save the backup data into backup data storage 110. However, as the amount of data in a file system that is required to be backed up continues to grow, the backup time can become very long.

Figure 2:
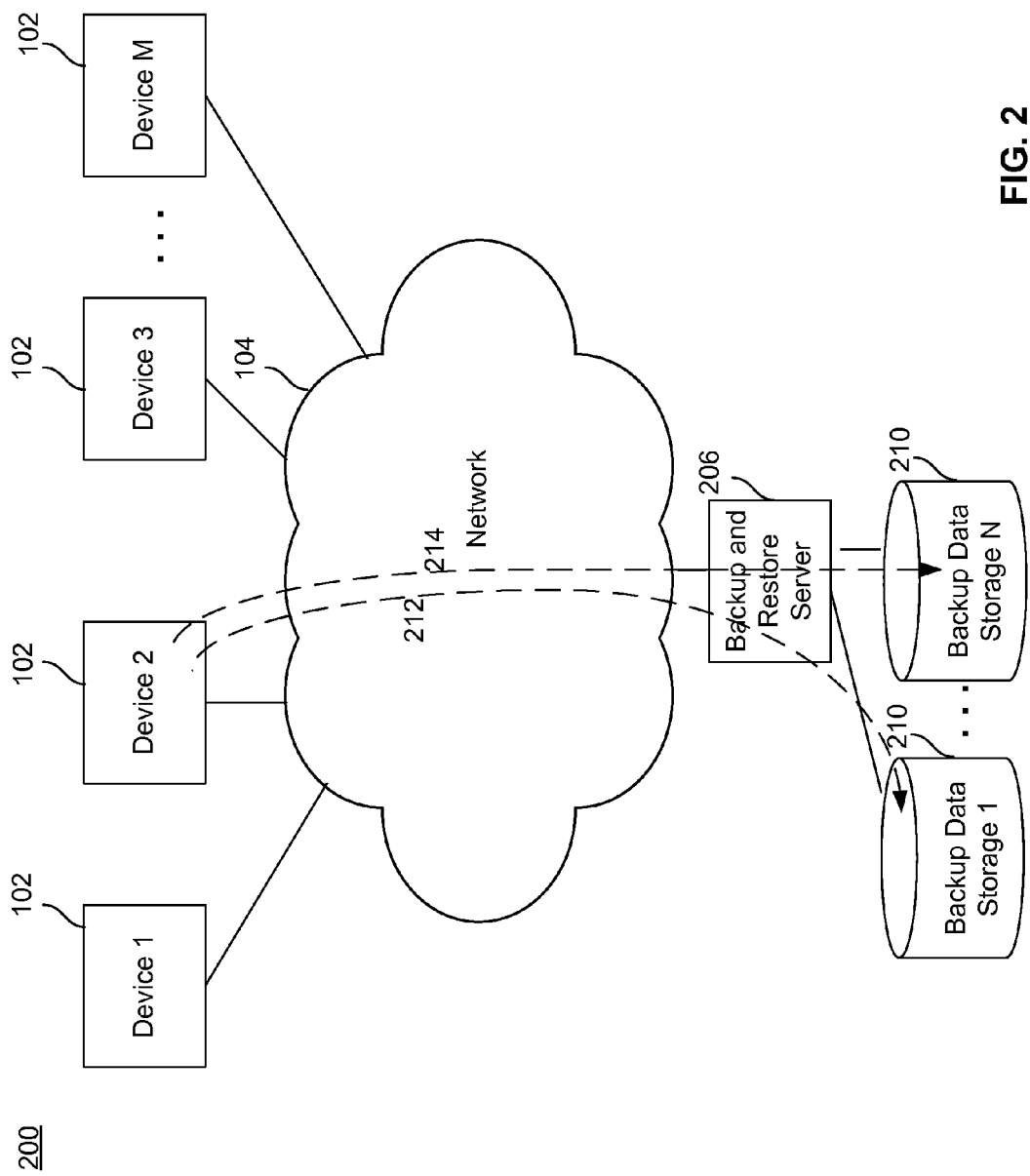
FIG. 2 is a block diagram in which a plurality of devices can be backed up by another embodiment of a backup and restore system.

FIG. 2 is a block diagram in which a plurality of devices can be backed up by another embodiment of a backup and restore system. A system administrator or a user may configure backup and restore server 206 to periodically backup the contents and data of a particular device 102 (e.g., device 2). For example, the system administrator may configure backup and restore server 206 to periodically backup a set of data stored on device 2. The set of data specified to be backed up is hereinafter referred to as an initial backup set. For example, an initial backup set may be the data stored in the entire file system (i.e., data stored under the root directory (also known as '/' on UNIX)) or the data stored under a particular directory, e.g., data stored under the /usr directory in a UNIX system. During the backup, the initial backup set is divided into a plurality of smaller subdivided backup sets in order to utilize the available resources more efficiently, thereby reducing the overall backup time. For example, as shown in FIG. 2, the initial backup set may be divided into two subdivided backup sets: subdivided backup set 212 and subdivided backup set 214. In some embodiments, the two subdivided backup sets may be processed by two separate processes running in parallel on device 2, thereby reducing backup time. For example, each of the processes may run in parallel on a separate CPU core. Each of the processes may read all the directories and files corresponding to its assigned subdivided backup set, process the data contained in those directories and files, and then save the corresponding set of backup data into a different backup data storage media 210 (i.e., backup data storage media 1 or backup data storage media N).

Figure 3:
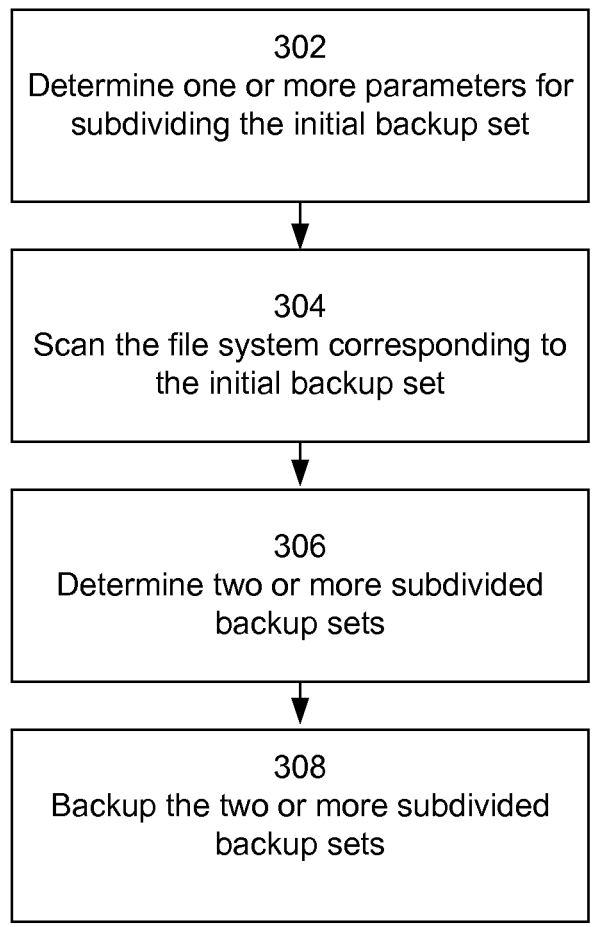
FIG. 3 is a flow chart illustrating an embodiment of a backup process 300.

FIG. 3 is a flow chart illustrating an embodiment of a backup process 300. In some embodiments, backup process 300 is a process that runs on a device 102 in FIG. 2. At 302, one or more parameters for subdividing the initial backup set are determined. The one or more parameters may be any parameter that affects or determines how the initial backup set is subdivided into multiple subdivided backup sets. In some embodiments, the one or more parameters may include a parameter that specifies the amount of data to divide the initial backup set into, e.g., the size may be specified in megabytes. This parameter is hereinafter referred to in the present application as the subdivision size. In some embodiments, the one or more parameters may include a parameter that specifies a number of subdivided backup sets the initial backup set is divided into, e.g., an integer number greater than one. This parameter is hereinafter referred to in the present application as the subdivision number. In some embodiments, the one or more parameters may specify a subset of the initial backup set that requires subdivision. The subset may be a list of directories within the initial backup set. For example, if the initial backup set includes two large directories (e.g., /dir1/ and /dir2), each storing a large amount of data, and a plurality of smaller directories, then the system administrator may configure the subset to include the two large directories (i.e., /dir1 and /dir2) only. In this case, the smaller directories will not be subdivided because the size of their stored data is not large enough to justify any subdivisions. A configured subset as described above is hereinafter referred to in the present application as a subdivision list.

At 304, the file system corresponding to the initial backup set is scanned. For example, the file system may be scanned by traversing through the file system to determine the size of all the directories within the file system, the size of the files within the directories, and the structure of the directory tree.

At 306, two or more subdivided backup sets are determined in the normal case. There is an edge case in which the size amount to split the backup into is very close or larger than the backup causing no split. For the sake of simplicity, this edge case will be ignored in most explanations. In some embodiments, the various scanned information obtained at 304 and the one or more parameters determined at 302 may be used collectively to determine how to subdivide the initial backup set efficiently.

At 308, the two or more determined subdivided backup sets are backed up. In some embodiments, the two or more determined subdivided backup sets may be backed up by separate processes running in parallel, thereby reducing backup time.

For example, each of the processes may run in parallel on a separate CPU core. Each of the processes may read all the directories and files corresponding to its assigned subdivided backup set and process the data contained in those directories and files. Processing of the data may include data deduplication to reduce storage size by eliminating duplicate copies of repeating data.

Each of the processes may also save the set of backup data corresponding to its assigned subdivided backup set into backup data storage media. In some embodiments, the two or more sets of backup data are stored into a single backup data storage media. In some embodiments, the two or more sets of backup data are stored into different backup data storage media.

Figure 4:
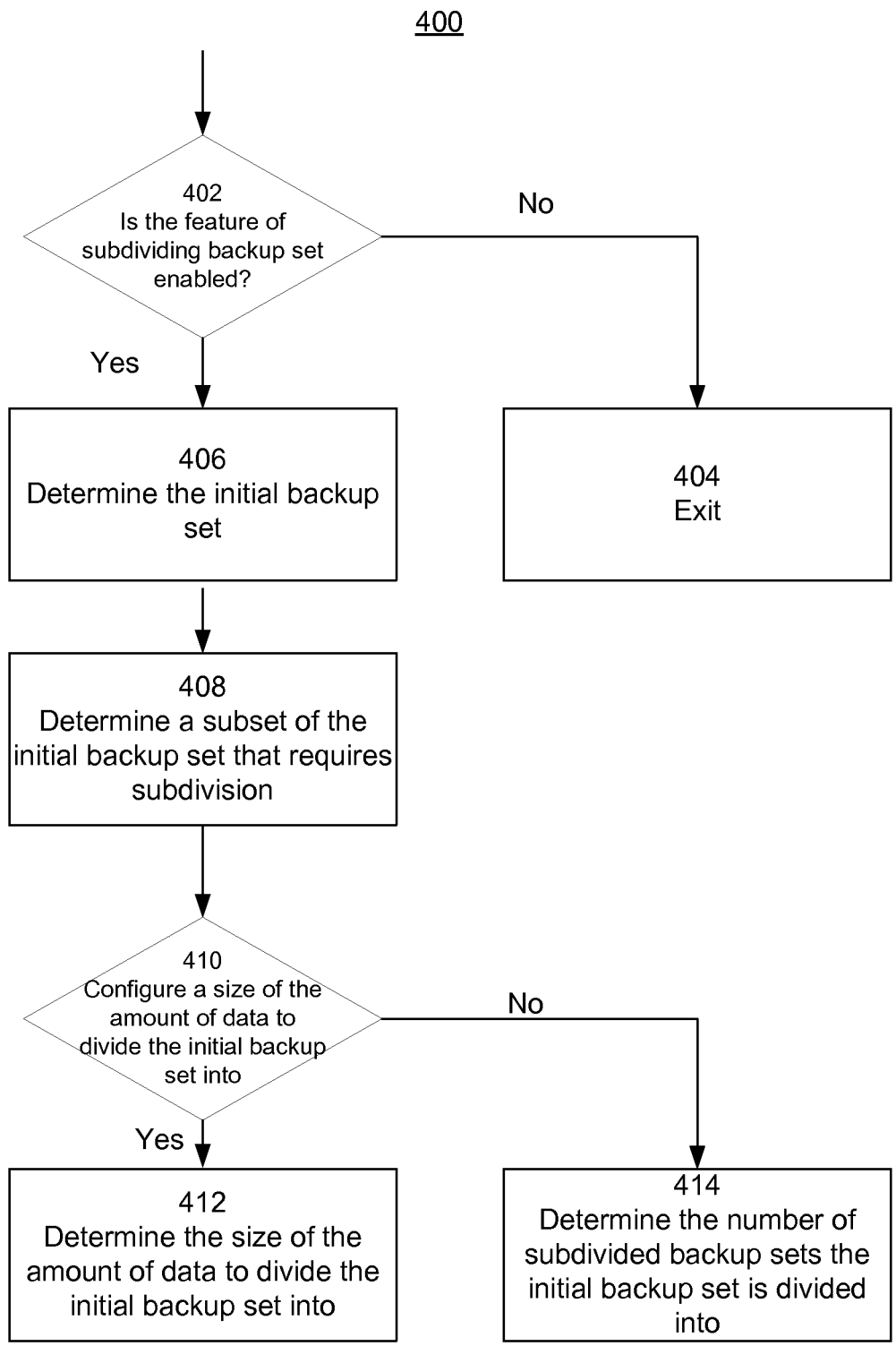
FIG. 4 is a flow chart illustrating an embodiment of a process 400 for determining one or more parameters for subdividing the initial backup set

FIG. 4 is a flow chart illustrating an embodiment of a process 400 for determining one or more parameters for subdividing the initial backup set. In some embodiments, process 400 is a process for step 302 of process 300 in FIG. 3. In some embodiments, the one or more parameters for subdividing the initial backup set may be determined based on configuration files. In some embodiments, the one or more parameters may be determined based on default values. In some embodiments, the one or more parameters may be determined based on a user configuration entered by a user via a graphical user interface (GUI).

At 402, it is determined whether the feature of subdividing an initial backup set is enabled or not. If the feature is disabled, then process 400 exits at 404. Otherwise, at 406, the initial backup set is determined. For example, based on user configuration, an initial backup set may be the data stored in the entire file system (i.e., data stored under the root directory (also known as '/' on UNIX)) or the data stored under a particular directory, e.g., data stored under the /usr directory in a Unix system.

At 408, it is determined whether only a subset of the initial backup should be subdivided. For example, the system administrator may configure via a GUI a subdivision list. If the subdivision list is configured to be empty, then the entire initial backup set is subject to subdivision. If the subdivision list is configured to include one or more paths specifying one or more directories within the initial backup set, then only the listed directories in the subdivision list will be subject to any subdivision.

At 410, it is determined whether the subdivision of the initial backup set is based on a configured subdivision size or based on a configured subdivision number. If the subdivision of the initial backup set is based on a configured subdivision size, then the configured subdivision size is determined at 412, for example based on a configuration file, a default value, or a user configuration via GUI. The configured subdivision size specifies the amount of data to divide the initial backup set into, e.g., the size may be specified in megabytes. If the subdivision of the initial backup set is based on a configured subdivision number, then the configured subdivision number is determined at 414. The configured subdivision number specifies the number of subdivided backup sets the initial backup set is divided into, e.g., an integer number greater than one.

Process 400 is an exemplary process for step 302 of process 300 in FIG. 3 only. Other processes may be used as well. For example, the steps in process 400 may be performed in a different order. In some embodiments, step 402 may be skipped because the feature is automatically enabled, as may be the case if the user has configured a subdivision size or a subdivision number.

Figure 5:
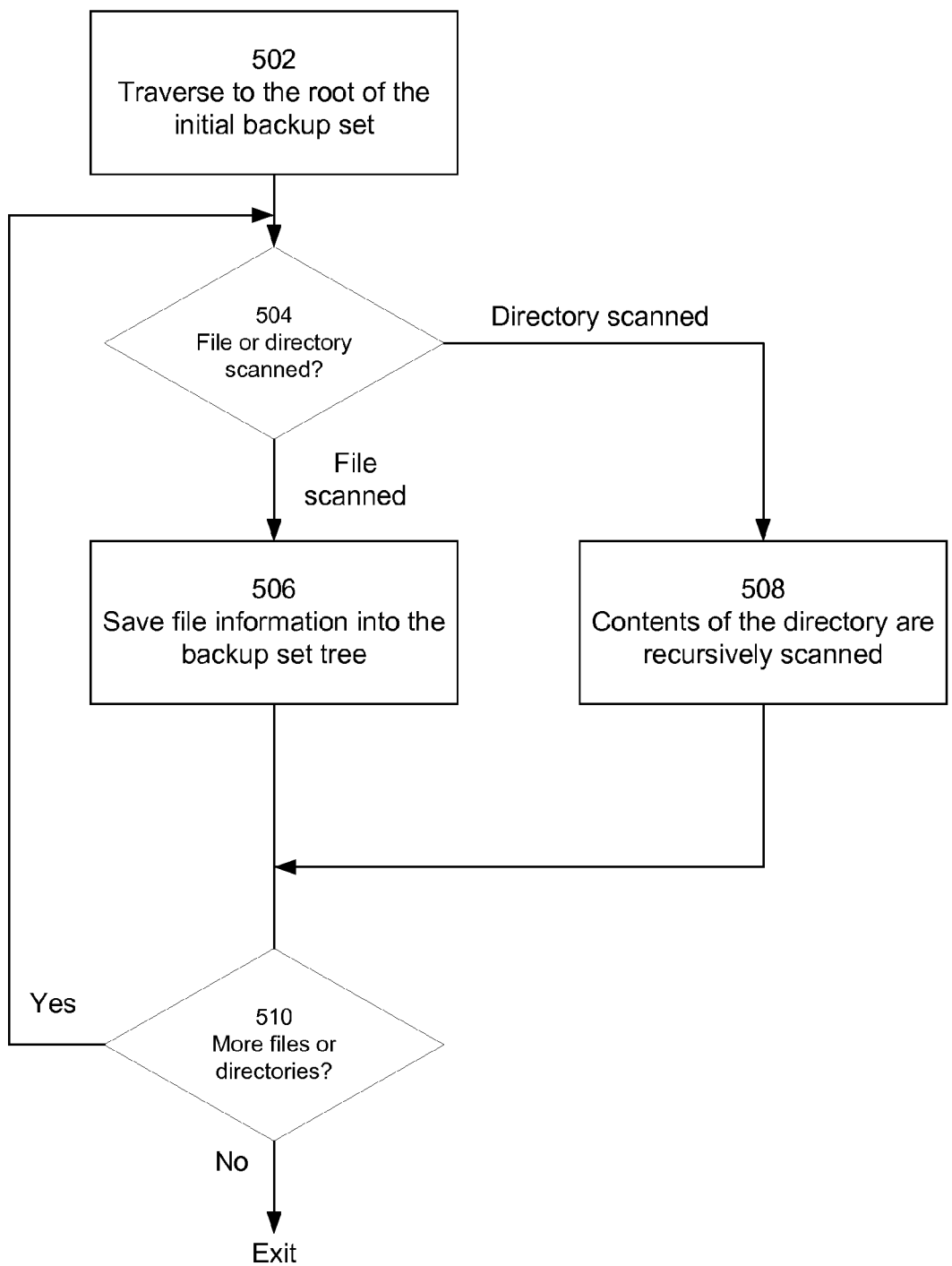
FIG. 5 is a flow chart illustrating a process 500 for building a backup set tree.

FIG. 5 is a flow chart illustrating a process 500 for building a backup set tree. In some embodiments, process 500 is a process for step 304 of process 300 in FIG. 3. The file system corresponding to the initial backup set may be scanned by traversing through the file system to determine the amount of data per directory, the total amount of data in the initial backup set, and the hierarchy or structure of the initial backup set within the file system. In some embodiments, scanning the file system corresponding to the initial backup set includes building a backup set tree that represents the initial backup set. The tree includes information regarding all the directories and files within the initial backup set. In some embodiments, all the scanned information, including the amount of data per directory, the total amount of data in the file system, and the structure of the file system, is saved while the backup set tree is built.

At 502, the file system corresponding to the initial backup set is traversed until the root of the initial backup set is reached. For example, if the initial backup set is specified by the path /user/data, then the file system is traversed until /user/data is reached.

At 504, it is determined whether a file or a directory is scanned. In some embodiments, the scan order may be in alphabetical order. In some embodiments, the scan order may be any order as long as all the contents are scanned.

At 506, if a file is scanned, then the file's information is saved. For example, the file's size is saved and stored in the tree. The file's size may also be added to a total size for the current directory or added to a total size for the entire backup set tree.

At 508, if the directory is scanned, then the contents (e.g., the files and directories) of the directory are recursively scanned. For example, if the content scanned is a file, then the file's information is saved (as described in step 506). If the content scanned is a directory, then the contents of that directory are again recursively scanned. After each directory is scanned, the total size of the directory is added to its parent directory.

At 510, it is determined whether there is any additional file or directory to be scanned. If there is an additional file or directory to be scanned, then control returns to step 504 and the process is continued. If there is no additional file or directory to be scanned, then process 500 will exit.

Figure 6:
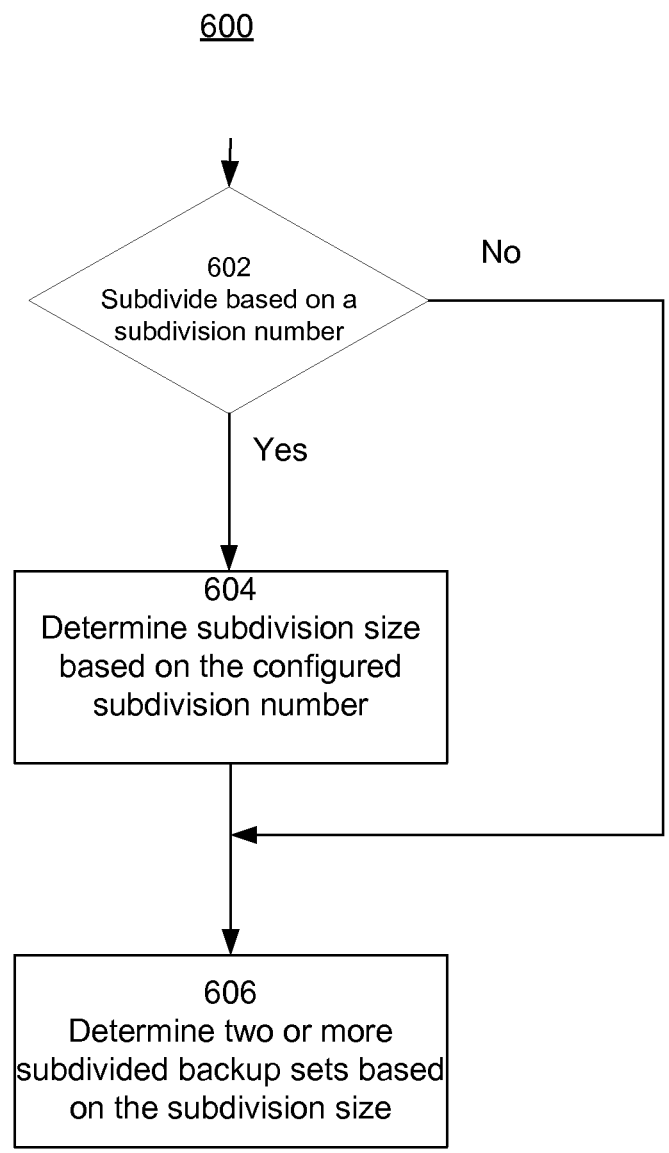
FIG. 6 is a flow chart illustrating a process 600 for determining two or more subdivided backup sets.

FIG. 6 is a flow chart illustrating a process 600 for determining two or more subdivided backup sets. In some embodiments, process 600 is a process for step 306 of process 300 of FIG. 3. At 602, it is determined whether the subdivision is based on a configured subdivision number. If the subdivision is based on a configured subdivision number, then an effective subdivision size is determined based on the configured subdivision number at 604. In some embodiments, an effective subdivision size is the total size of the backup set tree divided by the configured subdivision number. For example, if the total size of the backup set tree is five gigabytes and the configured subdivision number is five, then the effective subdivision size is one gigabyte.

At 606, two or more subdivided backup sets are determined based on the configured subdivision size or the effective subdivision size. In some embodiments, the subdivision is performed at a directory level of granularity. In some embodiments, the backup set tree is traversed and when a directory having a size that is greater than or smaller than the subdivision size within a predetermined threshold is encountered, the directory is subdivided as a separate subdivided backup set. When a directory that has a size that is greater than the subdivision size by more than the predetermined threshold is encountered, traversal of the backup set tree may continue within that directory to determine whether any of its subdirectories may be subdivided as a separate subdivided backup set. When a directory that has a size that is smaller than the subdivision size by more than the predetermined threshold (e.g., 20%) is encountered, traversal of the backup set tree may not continue within the directory, and the directory is grouped into the same subdivided backup set as its parent directory.

Figure 7:
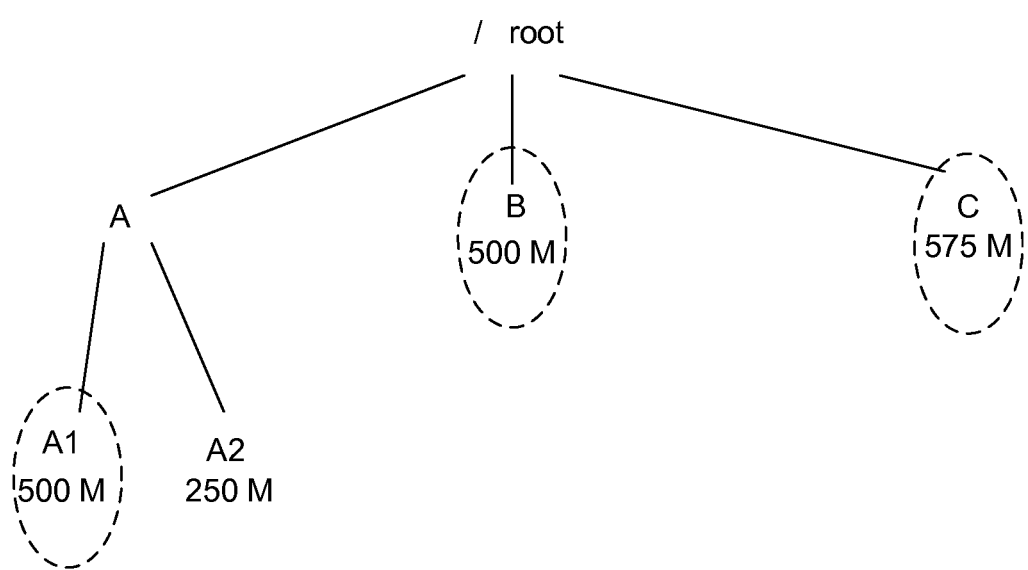
FIG. 7 is a diagram illustrating an embodiment of a backup set tree that is subdivided into a number of subdivided backup sets.

FIG. 7 is a diagram illustrating an embodiment of a backup set tree that is subdivided into a number of subdivided backup sets. In this illustrative example, the initial backup set is the / root directory. The configured subdivision size is 500 megabytes. The predetermined threshold is 20%. Since directory A1 and directory B are each 500 megabytes in size, directory A1 is subdivided as the first subdivided backup set, and directory B is subdivided as the second subdivided backup set. Directory C is bigger than the subdivision size but is still within the predetermined threshold. Accordingly, directory C is subdivided as the third subdivided backup set. Since directory A2 is much smaller than the subdivision size, it is grouped into the same subdivided backup set (i.e., subdivided backup set 4) as its parent directory. Subdivided backup set 4 includes files in the / directory, files in the A directory, and the A2 directory.

In some embodiments, once a directory is subdivided as a subdivided backup set, directives or rules may be added to the directory to prevent the directory from being backed up more than once or to prevent the directory from being subdivided as part of another subdivided backup set.

In some embodiments, a subsequent incremental backup may backup the file system using the same subdivided backup sets. As the distribution of the data in the file system changes over time, a full backup may be performed, and the file system may be subdivided into a new set of subdivided backup sets.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   collecting, by a processor, information from a file system corresponding to an initial backup set, wherein the initial backup set specifies a set of source directories or source files to be backed up as an individual set, and wherein the collected information comprises information regarding how the initial backup set is organized in files and directory hierarchies within the file system;
   determining, by the processor, two or more subdivided backup sets based at least in part on the collected information, wherein the initial backup set is subdivided into the two or more subdivided backup sets, and wherein the two or more subdivided backup sets specify portions of the set of source directories or source files to be backed up as two or more separate individual sets; and
   backing up the two or more subdivided backup sets.

2. The method of claim 1, wherein the backing up of the two or more subdivided backup sets is performed by two or more separate processes running in parallel.

3. The method of claim 2, wherein the two or more processes run on two or more CPU cores.

4. The method of claim 1, wherein the backing up of the two or more subdivided backup sets comprises saving the two or more subdivided backup sets into two or more data storage media.

5. The method of claim 1, further comprising:
   determining one or more parameters for subdividing the initial backup set into smaller backup sets; and determining the two or more subdivided backup sets further based on the one or more parameters.

6. The method of claim 5, wherein the one or more parameters comprises a subdivision size, wherein the subdivision size comprises an amount of data to divide the initial backup set into.

7. The method of claim 5, wherein the one or more parameters comprises a subdivision number, wherein the subdivision number comprises a number of subdivided backup sets the initial backup set is divided into.

8. The method of claim 5, wherein the one or more parameters comprises a subdivision list, wherein the subdivision list comprises a subset of the initial backup set that is subject to subdivision, and wherein remaining portions of the initial backup set are not subject to subdivision.

9. The method of claim 8, wherein the subdivision list comprises a list of directories within the initial backup set.

10. The method of claim 1, wherein collecting information from the file system corresponding to the initial backup set comprises building a backup set tree representing the initial backup set, wherein the backup set tree comprises information regarding files and directories within the initial backup set.

11. The method of claim 10, wherein the determining of the two or more subdivided backup sets is further based on the backup set tree.

12. The method of claim 1, wherein the collected information comprises one or more of the following: an amount of data for each directory within the initial backup set; a total amount of data in the initial backup set, and a hierarchy or structure of the initial backup set.

13. The method of claim 1, wherein collecting information from the file system corresponding to the initial backup set comprises traversing and scanning a directory tree corresponding to the initial backup set.

14. The method of claim 1, wherein the subdivided backup sets are subdivided from the initial backup set at a directory level of granularity.

15. The method of claim 1, further comprising performing a subsequent incremental backup, wherein the subsequent incremental backup is based on the two or more subdivided backup sets.

16. The method of claim 1, wherein backing up the two or more subdivided backup sets does not require a portion of the set of data to be backed up more than once.

17. A system for backing up data, comprising:
a processor configured to:
collect information from a file system corresponding to an initial backup set, wherein the initial backup set specifies a set of source directories or source files to be backed up as an individual set, and wherein the collected information comprises information regarding how the initial backup set is organized in files and directory hierarchies within the file system;
determine two or more subdivided backup sets based at least in part on the collected information, wherein the initial backup set is subdivided into the two or more subdivided backup sets, and wherein the two or more subdivided backup sets specify portions of the set of source directories or source files to be backed up as two or more separate individual sets; and
back up the two or more subdivided backup sets; and
a memory coupled to the processor and configured to provide the processor with instructions.

18. The system of claim 17, wherein the backing up of the two or more subdivided backup sets is performed by two or more separate processes running in parallel.

19. The system of claim 18, wherein the two or more processes run on two or more CPU cores.

20. The system of claim 17, wherein the backing up of the two or more subdivided backup sets comprises saving the two or more subdivided backup sets into two or more data storage media.

21. The system of claim 17, wherein the processor is further configured to:
determine one or more parameters for subdividing the initial backup set into smaller backup sets; and
determine the two or more subdivided backup sets further based on the one or more parameters.

22. The system of claim 21, wherein the one or more parameters comprises a subdivision size, wherein the subdivision size comprises an amount of data to divide the initial backup set into.

23. The system of claim 21, wherein the one or more parameters comprises a subdivision number, wherein the subdivision number comprises a number of subdivided backup sets the initial backup set is divided into.

24. The system of claim 21, wherein the one or more parameters comprises a subdivision list, wherein the subdivision list comprises a subset of the initial backup set that is subject to subdivision, and wherein remaining portions of the initial backup set are not subject to subdivision.

25. The system of claim 24, wherein the subdivision list comprises a list of directories within the initial backup set.

26. The system of claim 17, wherein collecting information from the file system corresponding to the initial backup set comprises building a backup set tree representing the initial backup set, wherein the backup set tree comprises information regarding files and directories within the initial backup set.

27. The system of claim 26, wherein the determining of the two or more subdivided backup sets is further based on the backup set tree.

28. The system of claim 17, wherein the collected information comprises one or more of the following: an amount of data for each directory within the initial backup set; a total amount of data in the initial backup set, and a hierarchy or structure of the initial backup set.

29. The system of claim 17, wherein collecting information from the file system corresponding to the initial backup set comprises traversing and scanning a directory tree corresponding to the initial backup set.

30. The system of claim 17, wherein the subdivided backup sets are subdivided from the initial backup set at a directory level of granularity.

31. The system of claim 17, wherein the processor is further configured to perform a subsequent incremental backup, wherein the subsequent incremental backup is based on the two or more subdivided backup sets.

32. The system of claim 17, wherein backing up the two or more subdivided backup sets does not require a portion of the set of data to be backed up more than once.

33. A computer program product for backing up data, the computer program product being embodied in a tangible computer readable storage medium and comprising computer instructions for:
collecting information from a file system corresponding to an initial backup set, wherein the initial backup set specifies a set of source directories or source files to be backed up as an individual set, and wherein the collected information comprises information regarding how the initial backup set is organized in files and directory hierarchies within the file system;

determining two or more subdivided backup sets based at least in part on the collected information, wherein the initial backup set is subdivided into the two or more subdivided backup sets, and wherein the two or more subdivided backup sets specify portions of the set of source directories or source files to be backed up as two or more separate individual sets; and backing up the two or more subdivided backup sets.

\* \* \* \* \*